May 5, 1964 A. F. FAIRBANKS 3,131,887
SLAVE MISSILE SYSTEM
Filed Sept. 15, 1952 2 Sheets-Sheet 1
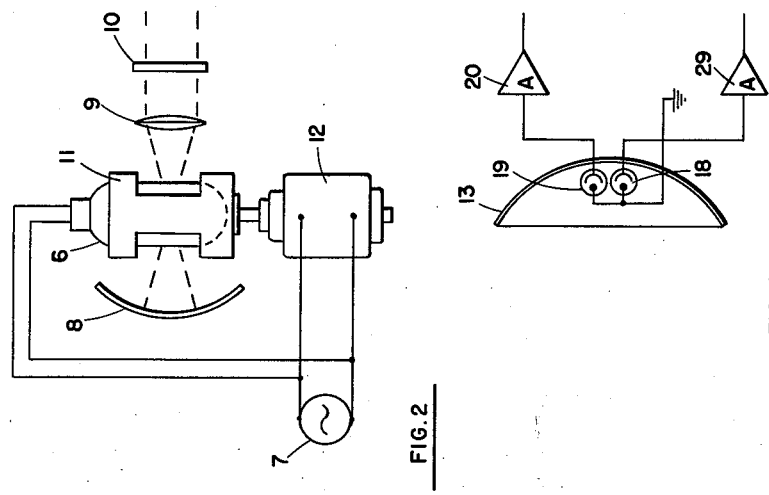
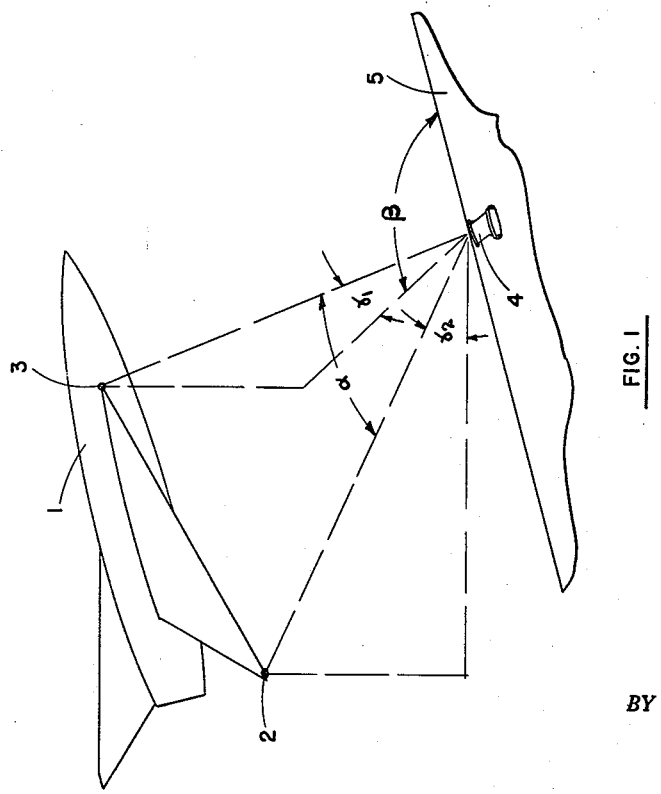
INVENTOR.
AVARD F. FAIRBANKS
BY *William R. Lane*
ATTORNEY

United States Patent Office 3,131,887
Patented May 5, 1964

3,131,887
SLAVE MISSILE SYSTEM
Avard F. Fairbanks, Garvey, Calif., assignor to
North American Aviation, Inc.
Filed Sept. 15, 1952, Ser. No. 309,675
8 Claims. (Cl. 244—14)

This invention relates to a control system for causing one or more slave aircraft to follow maneuvers of a companion pilot aircraft.

The cost and complexity of aircraft guidance systems makes their use in expendable missiles somewhat disadvantageous. In the past it has been proposed to utilize radio control originating from a single guided missile or aircraft to control the flight of companion missiles. Because such missiles find their maximum utility over hostile territory where all types of radio equipment are susceptible to interference or jamming, the radio type control link is undesirable.

This invention contemplates an infrared control link which is capable of controlling the flight of a slave aircraft or missile in pitch, yaw, and speed without the disadvantage of interference or jamming.

It is therefore an object of this invention to provide a slave missile control system.

It is another object of this invention to provide a slave missile control system involving a minimum of complexity.

It is another object of this invention to provide a slave missile system adapted to cause a slave aircraft to follow maneuvers of a pilot aircraft in pitch, yaw, and changes in speed, and to cause a slave aircraft to maintain a fixed relative flight position with respect to a pilot aircraft.

Other objects of invention will become apparent from the following description taken in connection with the accompanying drawings, in which FIG. 1 is a perspective view of the invention as applied to a single slave-pilot system, showing in particular the pertinent angles required to be measured by the system;

FIG. 2 is a schematic view of an infrared source and modulator used in connection with the invention;

FIG. 4 is a sectional view of the device shown in FIG. 3 taken at 4—4 in FIG. 3.

Figure 3:
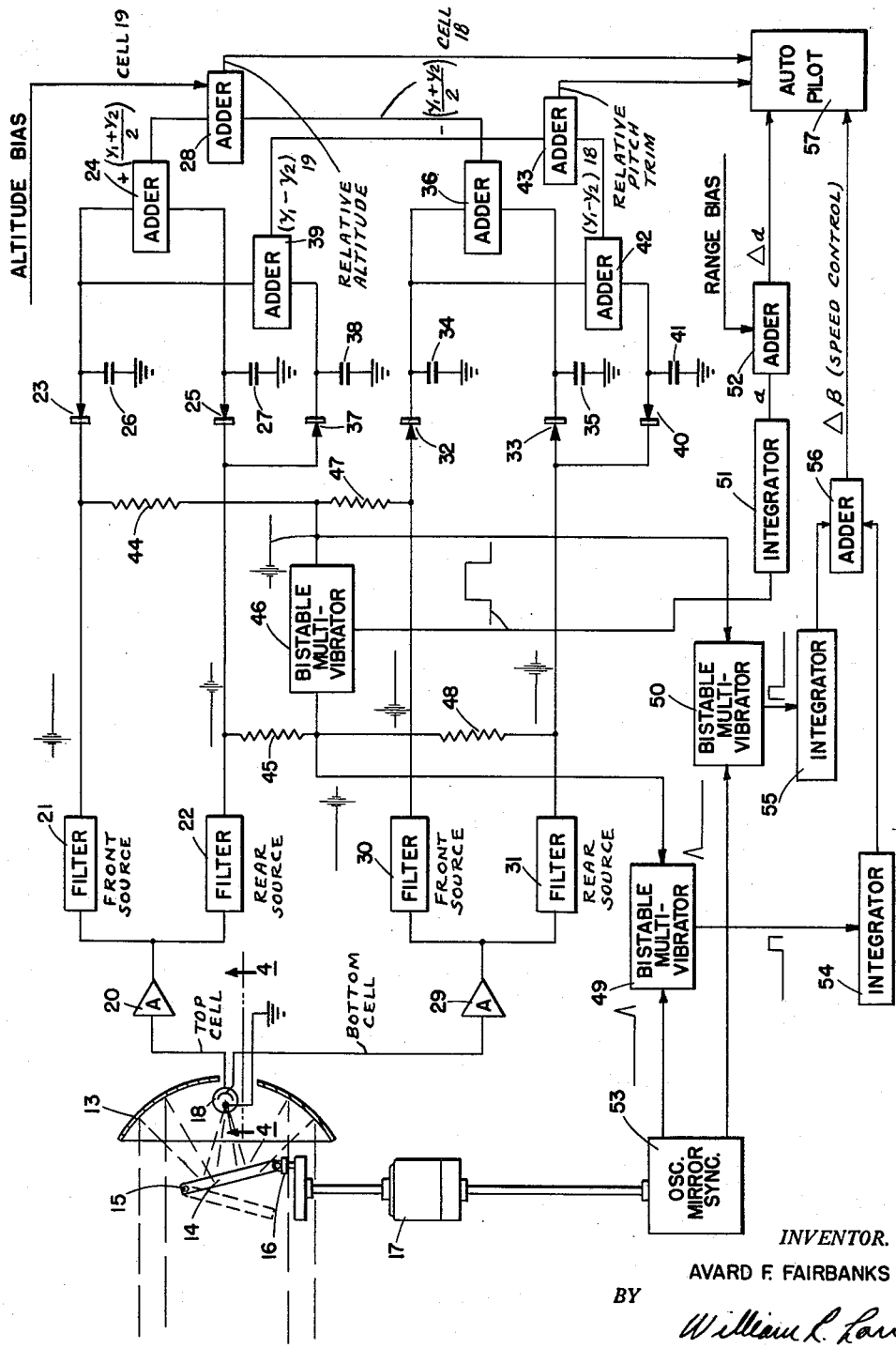
FIG. 3 is a schematic diagram of the invention.

Referring to the drawings, and in particular to FIG. 1, a pilot missile 1 carries infrared sources 2 and 3, radiation from which may be sensed by an infrared detector 4 mounted on slave missile 5. The angle subtended at the slave missile by sources 2 and 3 (on the pilot missile) is designated $\alpha$, while $\beta$ designates the angle in a horizontal plane between the heading of the slave missile and the line of sight to source 3 on the pilot missile. The angles $\gamma_1$ and $\gamma_2$ designate the angle between a line of sight to sources 2 and 3, respectively, from a horizontal plane.

Referring now to FIG. 2, each infrared source includes a light source 6 capable of admitting radiation within the infrared spectrum which is fed from a source of alternating current 7. Light from source 6 is reflected from reflector 8 and projected through lens 9 and filter 10 except when it is interrupted by rotating shutter 11 driven by motor 12, which is also energized from source 7. Motor 12 is preferably a constant speed motor, and the shutter of source 2 is driven at a speed differing markedly from the speed at which the shutter of source 3 is driven. The result, therefore, is a modulated beam of light emitted from each of the sources at differing modulation frequencies.

Referring now to FIG. 3, the equipment contained in each slave missile is shown in schematic form. Light from each source is received by primary mirror 13 and is focused upon vibrating mirror 14 which is pivoted about axis 15 and is vibrated by an eccentric 16 driven by motor 17. Vibrating mirror 14 therefore succeeds in scanning pilot missile 1 from stem to stern each time motor 17 rotates. Infrared sensitive photocells 18 and 19 are arranged one over the other on a vertical axis to receive radiation from mirror 14. The output of photocell 19 is fed to amplifier 20, the output of which is fed in parallel to filters 21 and 22. Filter 21 is tuned to pass only a frequency equivalent to the modulation frequency of source 2, while filter 22 is tuned to pass only the frequency corresponding to the modulation frequency of source 3. The output of filter 21 is fed to rectifier 23 and thence to adder 24. The output of filter 22 is fed to rectifier 25 and thence to adder 24. Rectifier 23 has associated with it capacitor 26, while rectifier 25 has associated with it capacitor 27. The output of adder 24 is fed to adder 28 by a similar network including amplifier 29, filters 30 and 31, rectifiers 32 and 33, capacitors 34 and 35, and adder 36. The output of adder 28 is connected to the input of autopilot 57 for controlling the altitude of the slave aircraft. A bias signal may also be fed to the autopilot along with the signal from adder 28 in order to set the relative altitude at which it is desired that the slave aircraft fly.

A parallel network connected as shown and including rectifier 37, capacitor 38, adder 39, rectifier 40, capacitor 41, adder 42, and adder 43 is connected to the input to autopilot 57 and is used to control the pitch attitude of the slave aircraft.

The outputs of filters 21 and 22 are connected by resistors 44 and 45, respectively, to the input of bistable multivibrator 46 as are the outputs of filters 30 and 31 connected thereto by resistors 47 and 48, respectively. The signal input to bistable multivibrator 46 is also connected to bistable multivibrators 49 and 50 as shown, while the output of bistable multivibrator 46 is connected to integrator 51 which in turn is connected to adder 52, the output of which is connected to the input of autopilot 57 to control the rudder servo of the aircraft. Bias may be introduced into adder 52 to set the range at which it is required that the slave aircraft fly from the pilot aircraft.

Motor 17 also drives a rotating switch or commutator 53 which feeds a signal to bistable multivibrator 49 each time mirror 14 has concluded a sweep or scan across the pilot missile, and a signal to bistable multivibrator 50 each time such a sweep or scan is started. The outputs of bistable multivibrators 49 and 50 are fed to integrators 54 and 55, respectively, whose output in turn is fed to adder 56. The output of adder 56 is connected to autopilot 57 and is used to control the speed of the slave aircraft.

In operation, sources 2 and 3 emit radiation, preferably in the infrared spectrum, having differing modulation frequencies. Mirror 14 is caused to oscillate by rotation of motor 17 so that the pilot aircraft is scanned from stem to stern many times per second. The radiation from sources 2 and 3 is therefore caused to fall periodically upon radiation sensitive cells 18 and 19 which feed signals to amplifiers 29 and 30, respectively. Considering for a moment the output of cell 19 and amplifier 20, since filter 21 is turned to pass only the frequency corresponding to one of the sources, the output thereof consists of a pulse for each time radiation from source 2 falls upon cell 19. The pulse is of time duration equal to the time during which radiation from source 2 actually falls upon the cell, and the pulse is actually the envelope of a series of pulses having a frequency equal to the modulation frequency of source 2. This pulse is rectified by rectifier 23 and filtered by action of condenser 26, and the resultant pulse is fed to adder 24 which also receives a similar signal passed by filter 22 and originating from source 3 to whose frequency filter 22 is tuned. A similar signal is derived from cell 18, amplifier 29, and filters 30 and 31 and adder 36. The outputs of adders 24 and 36 are added in adder 28 which also receives a bias signal, the value of which sets the relative altitude of the slave aircraft with respect to the pilot aircraft. It will be noted that the arrangement of rectifiers 32 and 33 is opposed to that of rectifiers 23 and 25 so that adder 36 yields a negative signal, while adder 24 yields a positive signal. If the two signals are equal, and if no bias is fed to adder 28, the output of adder 28 is zero, indicating that the slave aircraft is flying at the correct altitude with respect to the pilot aircraft. Altitude bias may be supplied electrically for fine adjustments of altitude, or mirror 13 may be inclined slightly with respect to the horizontal in the slave aircraft to effect whatever relative altitude is desired. If the output of adder 24, however, is greater than that of adder 36 with a given inclination of mirror 13, or assuming no altitude bias, a signal is fed from adder 28 to the autopilot and is used to correct the altitude of the slave aircraft until the signal outputs from adder 24 and adder 36 equal each other. The output of adder 28 therefore controls the magnitude of the average of the angles $\gamma_1$ and $\gamma_2$ in FIG. 1.

The pitch attitude of the slave aircraft represented by the difference between $\gamma_1$ and $\gamma_2$ in FIG. 1 is controlled by the output of adder 43, the inputs to which come from adders 39 and 42. Bearing in mind that FIG. 3 is a view of the receiver placed in each slave aircraft taken generally in a plane defined by sources 2 and 3 and the receiver, it is seen that adders 39 and 42 each yield a signal which is the difference between the signals resulting from source 2 and the signals resulting from source 3. In other words, because of the fact that rectifier 37 is reversed with respect to rectifier 23, the signal coming from filter 21 is subtracted from the signal coming from filter 22 in adder 39. A similar action occurs in adder 42, with the result that if the slave aircraft does not have the same pitch attitude as the pilot aircraft, adder 43 supplies an output signal to autopilot 57 to correct the pitch trim of the slave aircraft to correspond to that of the pilot aircraft. In this way the slave aircraft may be caused to follow closely the pitch maneuvers of the pilot aircraft, such as dives, loops, or climbs, with a minimum of time delay.

The range between the pilot aircraft and the slave aircraft is controlled by the output of adder 52 which receives its input from integrator 51, which in turn receives its input from bistable multivibrator 46. Bistable multivibrator 46 receives its inputs from filters 31 and 22 and from filters 30 and 21, as shown. Each time a signal is received from filters 22 and 31, multivibrator 46 starts feeding a signal to integrator 51. When bistable multivibrator 46 receives its next signal from filters 21 and 30, bistable multivibrator 46 ceases sending signals to integrator 51. The output of integrator 51 is therefore a D.-C. signal whose magnitude is proportional to the time between reception of radiation from source 2 and the reception of radiation from source 3. The greater the range of the pilot aircraft from the slave aircraft the smaller this time is. If a signal opposite in sign from the output of integrator 51 and corresponding in magnitude to the output of integrator 51 when the two aircraft are at the required range is supplied as a bias to adder 52, adder 52 has no output when the two aircraft are at the proper range, and has an output of one sign when the range is too great and of the opposite sign when the range is too small. This output is fed to autopilot 57 and is used to control the rudder of the slave aircraft to correct the range between the two aircraft.

The speed of the slave aircraft is controlled by the output of adder 56 whose inputs are integrators 54 and 55. Integrator 54 receives a signal from bistable multivibrator 49 when mirror 14 starts a sweep, which signal is terminated when a signal is received by bistable multivibrator 49 from filters 22 and 31. Likewise, integrator 55 receives a signal from bistable multivibrator 50 when filters 21 and 30 receive a signal from cell 19, which signal is terminated when bistable multivibrator 50 receives a signal from oscillating mirror synchronizer or switch 53 indicating that the sweep of mirror 14 has terminated. If, therefore, the time interval between commencement of a particular sweep or scan and the reception of radiant energy from source 2 does not equal the time interval between the reception of radiant energy from source 3 and the termination of the scan or sweep, adder 56 transmits a signal to autopilot 57 to alter the speed of the slave aircraft to bring the slave aircraft to a position exactly broad on the beam of the pilot aircraft.

Although the invention has been described and illustrated in detail, it is to be clearly understood that the same is by way of illustration and example only and is not to be taken by way of limitation, and spirit and scope of this invention being limited only by the terms of the appended claims.

I claim:

1. Means for controlling a slave aircraft in response to a pilot aircraft comprising a pair of radiation sources on said pilot aircraft displaced from each other along the longitudinal axis thereof, a pair of radiation sensitive devices arranged to scan said pilot aircraft in a direction parallel to a line joining said sources and arranged on a line normal to the plane formed by said sources and said radiation sensitive devices, and means responsive to said radiation sensitive devices for so controlling the heading of said aircraft as to maintain constant the time interval between reception of radiation from said two sources by said radiation sensitive means to thereby maintain the distance between said aircraft substantially constant.

2. A device as recited in claim 1 and further comprising means responsive to the relative strength of signal outputs of said two radiation sensitive means for controlling the altitude of said slave aircraft relative to said pilot aircraft to thereby cause said slave aircraft to maintain a fixed relative altitude position with respect to said pilot aircraft.

3. A device as recited in claim 1 and further comprising means responsive to the relative strength of signal outputs of both of said two radiation sensitive means from radiation received from each of said two sources for controlling the pitch attitude of said slave aircraft to thereby cause said slave aircraft to follow pitch maneuvers of said pilot aircraft.

4. A device as recited in claim 1 and further comprising means responsive to the time of reception of radiation from said sources relative to the commencement of each scan for controlling the speed of said slave aircraft to thereby cause said slave aircraft to maintain the same speed as said pilot aircraft.

5. Means for controlling a slave aircraft in response to a pilot aircraft comprising a pair of radiation sources on said pilot aircraft displaced from each other along the longitudinal axis thereof, a pair of radiation sensitive devices arranged to scan said pilot aircraft in a direction parallel to a line joining said sources and arranged on a line normal to the plane formed by said sources and said sensitive devices, and means responsive to the relative strength of signal outputs of said two radiation sensitive means for controlling the altitude of said slave aircraft to thereby cause said slave aircraft to maintain a fixed relative altitude position with respect to said pilot aircraft.

6. Means for controlling a slave aircraft in response to a pilot aircraft comprising a pair of radiation sources on said pilot aircraft displaced from each other along the longitudinal axis thereof, a pair of radiation sensitive devices arranged to scan said pilot aircraft in a direction parallel to a line joining said sources and arranged on a line normal to the plane formed by said sources and said radiation sensitive devices, and means responsive to the relative strength of signal outputs of both of said two radiation sensitive means from radiation received from each of said two sources for controlling the pitch attitude of said slave aircraft to thereby cause said slave aircraft to follow pitch maneuvers of said pilot aircraft.

7. Means for controlling a slave aircraft in response to a pilot aircraft comprising a pair of radiation sources on said pilot aircraft displaced from each other along the longitudinal axis thereof, a pair of radiation sensitive devices arranged to scan said pilot aircraft in a direction parallel to a line joining said sources and arranged on a line normal to the plane formed by said sources and said radiation sensitive devices, and means responsive to the time of reception of radiation from said sources relative to the commencement of each scan for controlling the speed of said slave aircraft to thereby cause said slave aircraft to maintain the same speed as said pilot aircraft.

8. Control means for causing a slave vehicle to follow a pilot vehicle comprising two sources of radiation located on said pilot vehicle, said sources having a component of relative displacement along the longitudinal axes of said vehicle, and radiation sensitive means located on said slave vehicle for controlling the speed and direction of said slave vehicle in response to radiation received from said sources on said pilot vehicle.

References Cited in the file of this patent

UNITED STATES PATENTS

| | | |
|---|---|---|
| 2,070,178 | Pottenger | Feb. 9, 1937 |
| 2,414,566 | Thomas | Jan. 21, 1947 |
| 2,439,294 | Hammond | Apr. 6, 1948 |
| 2,489,218 | Herbold | Nov. 22, 1949 |
| 2,489,221 | Herbold | Nov. 22, 1949 |

FOREIGN PATENTS

| | | |
|---|---|---|
| 636,185 | Great Britain | Apr. 26, 1950 |

UNITED STATES PATENT OFFICE
CERTIFICATE OF CORRECTION

Patent No. 3,131,887                                          May 5, 1964

Avard F. Fairbanks

It is hereby certified that error appears in the above numbered patent requiring correction and that the said Letters Patent should read as corrected below.

Column 2, line 60, for "30" read -- 20 --; line 62, for "turned" read -- tuned --.

Signed and sealed this 9th day of March 1965.

(SEAL)
Attest:

ERNEST W. SWIDER                                EDWARD J. BRENNER
Attesting Officer                                      Commissioner of Patents